(12) United States Patent
Wang

(10) Patent No.: US 11,500,236 B2
(45) Date of Patent: Nov. 15, 2022

(54) DISPLAY PANEL AND MANUFACTURING METHOD OF SAME

(71) Applicant: Shenzhen China Star Optoelectronics Semiconductor Display Technology Co., Ltd., Shenzhen (CN)

(72) Inventor: Kaijun Wang, Shenzhen (CN)

(73) Assignee: Shenzhen China Star Optoelectronics Semiconductor Display Technology Co., Ltd., Shenzhen (CN)

( * ) Notice: Subject to any disclaimer, the term of this patent is extended or adjusted under 35 U.S.C. 154(b) by 0 days.

(21) Appl. No.: 16/620,956

(22) PCT Filed: Oct. 25, 2019

(86) PCT No.: PCT/CN2019/113171
§ 371 (c)(1),
(2) Date: Dec. 10, 2019

(87) PCT Pub. No.: WO2020/237993
PCT Pub. Date: Dec. 3, 2020

(65) Prior Publication Data
US 2022/0075226 A1    Mar. 10, 2022

(30) Foreign Application Priority Data

May 24, 2019 (CN) .......................... 201910441983.5

(51) Int. Cl.
*G02F 1/1333* (2006.01)
*G02F 1/1335* (2006.01)
(Continued)

(52) U.S. Cl.
CPC ...... *G02F 1/133365* (2013.01); *G02F 1/1341* (2013.01); *G02F 1/13394* (2013.01);
(Continued)

(58) Field of Classification Search
None
See application file for complete search history.

(56) References Cited

U.S. PATENT DOCUMENTS 5,535,026 A * 7/1996 Fujimori ........... G02F 1/133377
349/84
5,668,651 A    9/1997 Yamada et al.
(Continued)

FOREIGN PATENT DOCUMENTS

CN    1117142 A    2/1996
CN    1120177 A    4/1996
(Continued)

*Primary Examiner* — Ryan Crockett
(74) *Attorney, Agent, or Firm* — Nathan & Associates; Menachem Nathan

(57) ABSTRACT

This discourse provides a display panel and a manufacturing method of the same. The display panel comprises an array substrate, a color filter substrate, a sealant, a plurality of metal electrodes, and a plurality of walls. The sealant is disposed on edges of the array substrate and the color filter substrate, sealing the array substrate and the color filter substrate. The plurality of metal electrodes are arranged on an aperture region of a plurality of pixel units of the array substrate. A top of the plurality of walls contacts with an inner surface of the color filter substrate. The plurality of walls block liquid crystals on left and right sides, ensuring uniformity of thickness of liquid crystal cells.

5 Claims, 3 Drawing Sheets

(51) Int. Cl.
*G02F 1/1339* (2006.01)
*G02F 1/1341* (2006.01)
*G02F 1/1343* (2006.01)

(52) U.S. Cl.
CPC .... *G02F 1/13439* (2013.01); *G02F 1/133305* (2013.01); *G02F 1/133382* (2013.01); *G02F 1/133516* (2013.01); *G02F 1/134309* (2013.01)

(56) References Cited

U.S. PATENT DOCUMENTS

| | | | |
|---|---|---|---|
| 5,726,728 A | | 3/1998 | Kondo et al. |
| 5,729,312 A | * | 3/1998 | Yamagishi .......... G02F 1/13394 349/86 |
| 5,828,434 A | * | 10/1998 | Koden .............. G02F 1/133512 349/110 |
| 9,804,467 B2 | | 10/2017 | Kim et al. |
| 2005/0083478 A1 | * | 4/2005 | Lee ...................... G02F 1/1341 349/156 |
| 2006/0146267 A1 | * | 7/2006 | Choi ................... G02F 1/13394 349/156 |
| 2013/0003001 A1 | | 1/2013 | Inoue et al. |
| 2016/0062157 A1 | * | 3/2016 | Kim ...................... G02F 1/1337 445/24 |
| 2016/0154259 A1 | * | 6/2016 | Kim ................... G02F 1/134363 349/33 |
| 2016/0252768 A1 | * | 9/2016 | Zhong ............... G02F 1/133512 349/43 |
| 2016/0341992 A1 | * | 11/2016 | Lee ....................... G02F 1/1368 |
| 2018/0107071 A1 | * | 4/2018 | Peng ................ G02F 1/134309 |
| 2019/0204648 A1 | * | 7/2019 | Chen ................... C09K 19/544 |
| 2021/0333594 A1 | * | 10/2021 | Zou .................. G02F 1/133512 |
| 2021/0356781 A1 | * | 11/2021 | Wang ............... G02F 1/133305 |

FOREIGN PATENT DOCUMENTS

| | | |
|---|---|---|
| CN | 1124356 A | 6/1996 |
| CN | 1564962 A | 1/2005 |
| CN | 105388658 A | 3/2016 |
| CN | 107942567 A | 4/2018 |

\* cited by examiner

DISPLAY PANEL AND MANUFACTURING METHOD OF SAME

BACKGROUND OF INVENTION

Field of Invention

This disclosure relates to the field of flexible display technology, and particularly relates to a display panel and a manufacturing method of the same.

Description of Prior Art

A thin film transistor-liquid crystal display (TFT-LCD) has characteristics of ultrathin, flexible, light weight, and high freedom of design, etc., and therefore, has a wide market application prospect in mobile communication, television, and wearable device.

However, present flexible panel can't be put into large-scale mass production. In conventional flexible LCD panel, spacers disposed inside a display panel cannot function well. When the display panel is bent, inhomogeneity of liquid crystal flow inside the display panel and inhomogeneity of thickness of cell often occur. Ideally, thickness of the whole liquid crystal cell should be same, and the inhomogeneity will result in optical path differences between liquid crystals. It deforms badly especially in the curved corners, and even causes problem of poor display effect or display failure while the flexible liquid crystal panel is being bent.

When present flexible liquid crystal panel is bended, problems of inhomogeneity of liquid crystal flow inside the display panel and inhomogeneity of thickness of cells and so on exist, which lead to poor display effect or display failure.

Therefore, further improvement and solution are needed.

To solve the above problems, this disclosure provides a display panel and a manufacturing method of the same to solve problems of inhomogeneity of liquid crystal flow inside the display panel and inhomogeneity of thickness of liquid crystal cells, which lead to poor display effect or display failure.

SUMMARY OF INVENTION

In order to solve above technical problems, technical schemes provided by embodiments of this disclosure are as below.

According to the first aspect of embodiments of this disclosure, A display panel, comprising:

an array substrate;

a color filter substrate, wherein the color filter substrate is disposed opposite to the array substrate;

a sealant, wherein the sealant is disposed on edges of the array substrate and the color filter substrate, and the sealant seals the array substrate and the color filter substrate;

a plurality of metal electrodes, wherein the metal electrodes are rectangular shaped metal electrodes, and the metal electrodes are indium tin oxide electrodes; and a plurality of walls, wherein the metal electrodes are arranged on the array substrate, bottom portions of the plurality of walls contact an inner surface of the array substrate, and top portions of the plurality of walls contact an inner surface of the color filter substrate.

According to an embodiment of this disclosure, the metal electrodes are arranged in an aperture region of a plurality of pixel units of the display panel.

According to an embodiment of this disclosure, the display panel further comprises a liquid crystal mixture that is disposed between the array substrate and the color filter substrate.

According to an embodiment of this disclosure, the liquid crystal mixture comprises liquid crystals, oligomers, monomers, and thermal initiators.

According to an embodiment of this disclosure, the liquid crystals comprise nematic liquid crystals, and a mass fraction of the liquid crystals is in a range from 60 wt % to 90 wt %.

According to an embodiment of this disclosure, the thermal initiators comprise one or more of diethylenetriamine, triethylenetetramine, 4,4'-Methylenedianiline, and polyatomic acid.

According to an embodiment of this disclosure, the oligomers are epoxy resin oligomers, and the monomers are one or more of bisphenol A, polybutene, dicyclopentadiene.

According to the second aspect of embodiments of this disclosure, a display panel, comprising:

an array substrate;

a color filter substrate, wherein the color filter substrate is disposed opposite to the array substrate;

a sealant, wherein the sealant is disposed on edges of the array substrate and the color filter substrate, and the sealant seals the array substrate and the color filter substrate;

a plurality of metal electrodes; and a plurality of walls, wherein, the metal electrodes are arranged on the array substrate, bottom portions of the plurality of walls contact an inner surface of the array substrate, and top portions of the plurality of walls contact an inner surface of the color filter substrate.

According to an embodiment of this disclosure, the metal electrodes are rectangular shaped metal electrodes and are arranged in an aperture region of a plurality of pixel units of the display panel.

According to an embodiment of this disclosure, the display panel further comprises a liquid crystal mixture that is disposed between the array substrate and the color filter substrate.

According to an embodiment of this disclosure, the liquid crystal mixture comprises liquid crystals, oligomers, monomers, and thermal initiators.

According to an embodiment of this disclosure, the oligomers are epoxy resin oligomers, the monomers are one or more of bisphenol A, polybutene, and dicyclopentadiene, and the thermal initiators are one or more of diethylenetriamine, triethylenetetramine, diaminodiphenyl methane, and polyatomic acid.

According to the third aspect of embodiments of this disclosure, a manufacturing method of a display panel, comprising:

a step S100 of coating flexible thin films on each of two carrier substrates;

a step S101 of forming films on each of the two carrier substrates obtained by the step S100 to form an array substrate and a color filter substrate;

a step of S102 of cutting the color filter substrate and coating the array substrate and the color filter substrate with a sealant and a liquid crystal mixture;

a step of S103 of bonding the color filter substrate with the array substrate opposite to each other and irradiating by an ultraviolet light;

a step of S104 of applying a voltage to the array substrate to polymerize the liquid crystal mixture to form a plurality of polymer walls; and a step S105 of separating the flexible thin films from the carrier substrates to form a flexible display panel.

According to an embodiment of this disclosure, in the step S103, a region of the sealant is only irradiated by the ultraviolet light.

According to an embodiment of this disclosure, order of the step S102 and the step S103 is interchangeable.

According to an embodiment of this disclosure, in the step S104, after applying the voltage, waiting for 1 min to 5 mins before heating the array substrate.

According to an embodiment of this disclosure, in the step S104, the voltage is in a range of 3V to 10V, a heating temperature is in a range of 100° C. to 150° C., and a heating time is in a range of 30 mins to 180 mins.

This disclosure provides a new display panel and a manufacturing method of the same. The liquid crystal compounds are filled into the space between the array substrate and the color filter substrate so that the liquid crystal compounds will form the polymer walls in a non-aperture region of a plurality of pixel units after voltage is applied and after being heated, the walls support the array substrate and the color filter substrate. Therefore, when the flexible liquid crystal display panel is bended, homogeneity of the thicknesses of the liquid crystal cells is ensured while flow of the liquid crystals can be prevented, thereby solving the problem of unsatisfactory display effect when the display panel is bended.

DETAILED DESCRIPTION OF PREFERRED EMBODIMENTS

The description of following embodiment, with reference to the accompanying drawings, is used to exemplify specific embodiments which may be carried out in the present disclosure.

A flexible display panel can be bended or folded to a certain extent, without affecting display effect. Therefore, application prospect of the flexible display panel is quite broad. However, when a flexible display panel designed in prior art is bended, spacers cannot attach the upper and lower substrates of the display panel at the same time, which results in inhomogeneity of thickness of cells, thereby affecting the display effect.

In embodiments of this disclosure, a new type of liquid crystal compounds is provided. The liquid crystal compounds are filled into the space between array substrate and color filter substrate. The liquid crystal compounds comprise liquid crystals, monomers, and initiators. The dielectric constants of liquid crystals, monomers, and initiators have great difference, when a voltage is applied to the liquid crystal compounds, phase separation happens between the liquid crystals, the monomers, and the initiators under the voltage. Substances with higher dielectric constant, such as liquid crystals, will be separated to an area of higher voltage while substances with lower dielectric constant, such as monomers and initiators, will be separated to an area of lower voltage.

When separation of the liquid crystal compounds completes, conduct treatments by processes of ultraviolet light irradiation and heating, etc. at the same time. Monomers and initiators, etc. separated to the outside of pixel area are cured to form a wall by chemical reaction, so as to work as a supporter.

Specifically, the exact ingredients of the liquid crystal compounds comprise liquid crystals, oligomers, monomers, and thermal initiators. During the preparation of the liquid crystal compounds, the liquid crystals are selected according to the exact display mode of the display panel. Nematic liquid crystals are selected in general. A mass fraction of the liquid crystals is in a range from 60 wt % to 90 wt %. The oligomers are mainly epoxy resin oligomers, specifically, one or more of bisphenol A, polybutene, and dicyclopentadiene. A mass fraction of the oligomers is in a range of 5 wt % to 30 wt %. The monomers comprise single-functional monomers or bi-functional monomers and multi-functional monomers. Specifically, the monomers are one or more of bisphenol A, polybutene, and dicyclopentadiene. A mass fraction of the monomers is in a range of 3 wt %-25 wt %. The thermal initiators are one or more of diethylenetriamine, triethylenetetramine, 4,4'-Methylenedianiline, and polyatomic acid. A mass fraction of the thermal initiators is in a range of 0.5 wt %-5 wt %.

Figure 1:
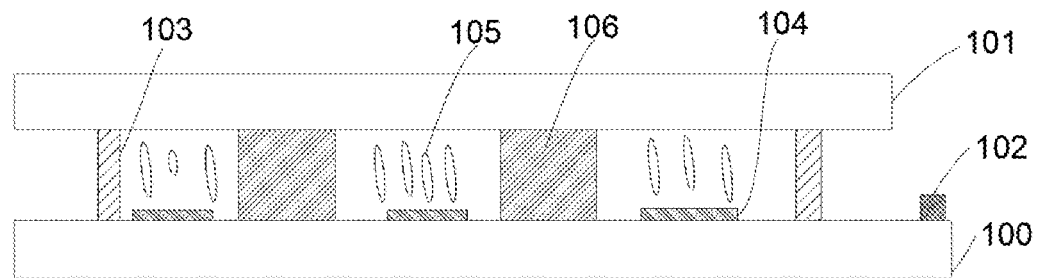
FIG. 1 is a structural schematic view of a display panel of embodiments of this disclosure.

Preferably, embodiments of this disclosure provide a display panel. As shown in FIG. 1, FIG. 1 is a structural schematic view of a display panel provided by embodiments of this disclosure. The display panel comprises an array substrate 100 and a color filter substrate 101. The array substrate 100 and the color filter substrate 101 are disposed oppositely to form a cell. The display panel further comprises a sealant 103 which is disposed between the array substrate 100 and the color filter substrate 101. The sealant 103 is disposed on edge regions of the array substrate 100 and the color filter substrate 101. When the two substrates form a cell, the sealant seals the array substrate 100 and the color filter substrate 101.

Meanwhile, the display panel further comprises a plurality of metal electrodes 104, liquid crystals 105, and a plurality of walls 106. The plurality of metal electrodes 104 are arranged on the array substrate 100. Specifically, on an aperture region of a plurality of pixel units of the array substrate 100. The plurality of walls 106 is formed by having liquid crystal compounds provided by embodiments of this disclosure aggregated after voltage is apply and polymerized by heating. The plurality of walls 106 is arranged on a non-aperture region of the plurality of pixel units, and top of the plurality of walls 106 is bonded to an inner surface of the color filter substrate 101 and bottom of the plurality of walls 106 is bonded to an inner surface of the array substrate 100. Therefore, the plurality of walls 106 form a kind of support pillar bonding upper and lower substrates. When the display panel is bended under force, a structure of the support pillar will prevent a depression between the array substrate 100 and the color filter substrate 101. At the same time, due to an obstruction of the plurality of walls 106, it is impossible for liquid crystals 105 to flow to both sides of the plurality of walls 106, thus ensuring the homogeneity of thicknesses of liquid crystal cells of the display panel in bending area.

Figure 2:
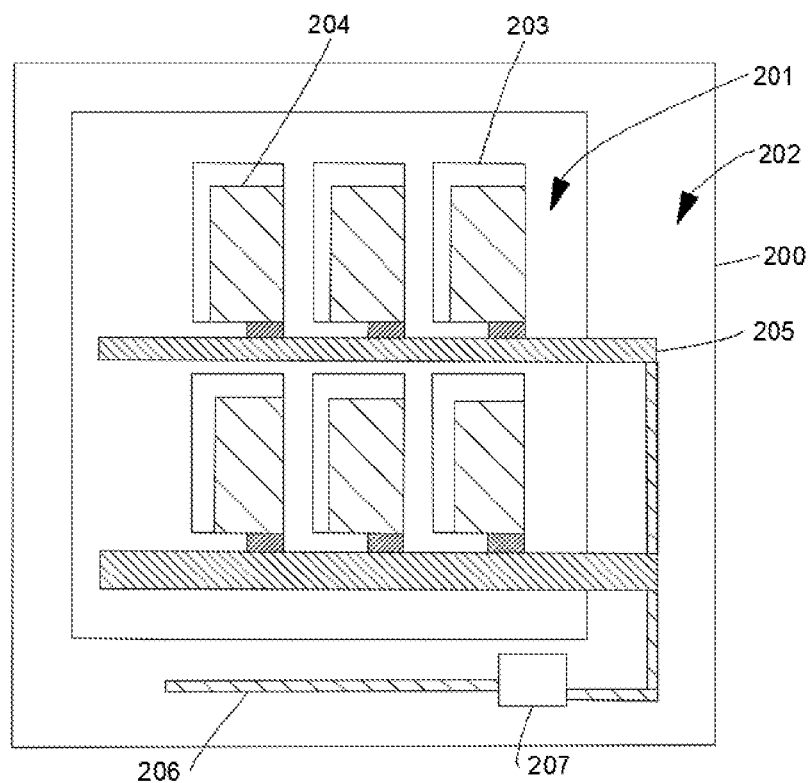
FIG. 2 is a schematic plan view of a display panel provided by embodiments of this disclosure.

When placing a display panel provided by embodiments of this disclosure, as shown in FIG. 2, FIG. 2 is a schematic plan view of the display panel of embodiments of this disclosure. A display area 201 and a peripheral area 202 are in a display panel 200, and a plurality of pixel units 203 are arranged in the display area. The display panel also comprises a plurality of first metal electrodes 204 and a plurality of second metal electrodes 205, wherein the first metal electrodes 204 are arranged in an aperture region of the plurality of pixel units and the second metal electrodes 205 are arranged around a plurality of gate lines. The display panel 200 further comprises a common electrode line 206 and a common electrode 207. In embodiments of this disclosure, the plurality of first metal electrodes 204 can be a plurality of transparent metal electrodes configured additionally or can be commonly shared with pixel electrodes. The plurality of second metal electrodes 205 are a plurality of metal electrodes configured additionally, which can be either a plurality of transparent metal electrodes or a plurality of non-transparent metal electrodes. The plurality of metal electrodes 204 are mainly arranged in an aperture region of each pixel unit. The plurality of metal electrodes 204 can further extend to the non-aperture region to ensure the aperture region of the plurality of pixel units are filled with liquid crystals. The plurality of first metal electrode 204 and the plurality of second metal electrode 205 are connected with the common electrode line 206, and the common electrode line 206 is connected with the common electrode 207. In this way, the configuration of the plurality of metal electrodes on the array substrate is completed. In the subsequent processes, a conductive circuit is constructed by applying a voltage at the common electrode 207 and on the color filter substrate, so as to allow phase separation of liquid crystal compounds inside the display panel to happen and make preparation for subsequent manufacturing processes.

Figure 3:
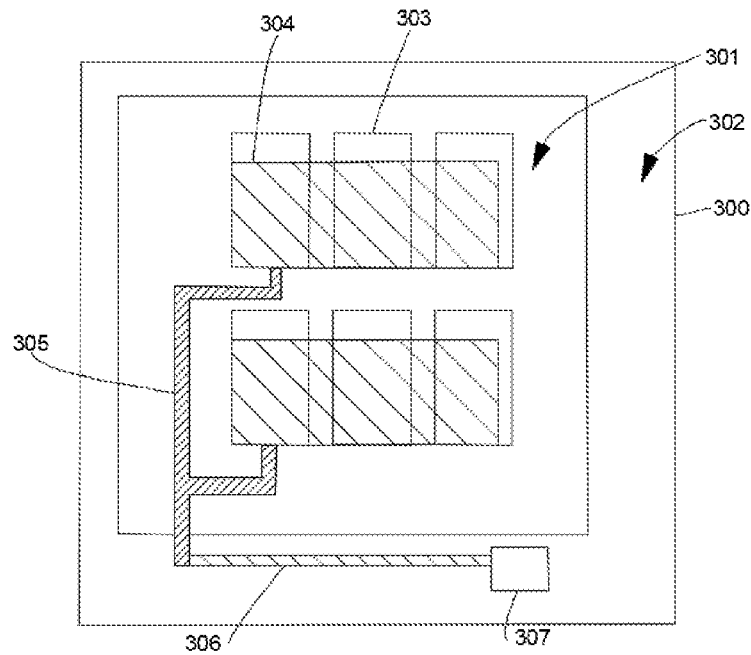
FIG. 3 is a schematic plan view of a display panel provided by another embodiment of this disclosure.

The plurality of metal electrodes of FIG. 2 are mainly arranged in the aperture region of each sub-pixel unit. Preferably, as shown in FIG. 3, FIG. 3 is a schematic plan view of a display panel provided by another embodiment of this disclosure. A display panel 300 comprises a display area 301, a non-display area 302, and a plurality of pixel units 303 arranged in the display area 301, wherein, further comprising a plurality of first metal electrodes 304 and a plurality of second metal electrodes 305, all of the plurality of first metal electrodes 304 and the plurality of second metal electrodes 305 are connected with a common electrode line 306. Meanwhile, the common electrode line 306 is connected with a common electrode 307. Comparing to FIG. 2, in the embodiment of this disclosure, when configuring the plurality of metal electrodes, one rectangular shaped first metal electrode 304 is arranged around three sub-pixel units, and the plurality of first metal electrodes 304 are a plurality of transparent electrodes configured additionally. In particular, they can consist of indium tin oxide. Then, the plurality of metal electrodes is connected with the common electrode line, and then the common electrode line is connected with the common electrode. At this time, according to details of flexible display panel, a number of the plurality of metal electrodes arranged in the display panel can be reduced.

The above arrangement of the plurality of metal electrodes was only part of examples. In practice, according to specific requirements, the number of the plurality of metal electrodes can be increased in areas where polymer walls are needed. And in the embodiment of this disclosure, the increased metal electrodes can share common mask with data lines, gate lines and pixel units during the processes of production. Thus, processes using masks will not be increased.

Figure 4:
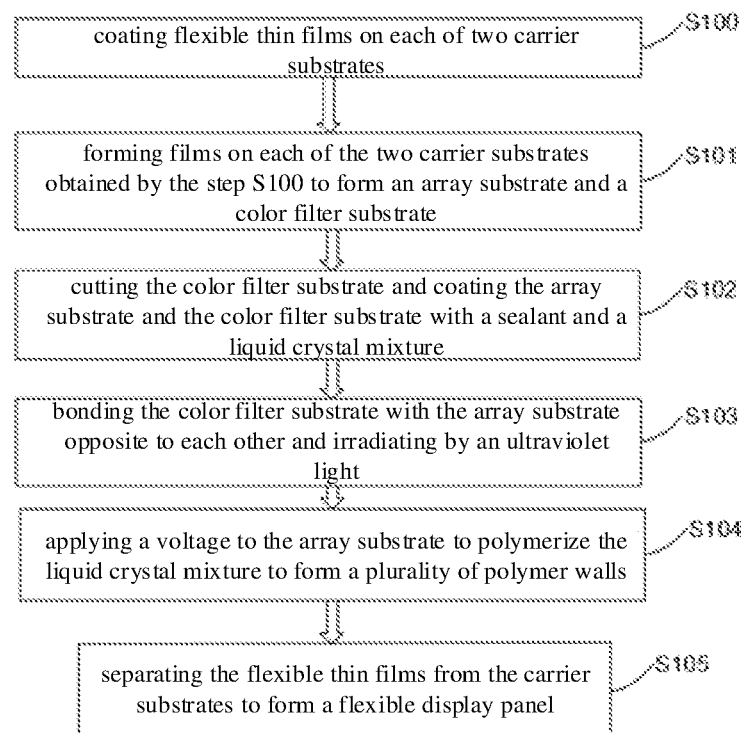
FIG. 4 is a flow chart of a manufacturing method for a display panel provided by embodiments of this disclosure.

A manufacturing method for a display panel is also provided by embodiments of this disclosure. As shown in FIG. 4, FIG. 4 is a flow chart of a manufacturing method for a display panel provided by embodiments of this disclosure. Wherein, the manufacturing method comprises below steps:

a step S100 of coating flexible thin films on each of two carrier substrates;

specifically, selecting two pieces of carrier substrates, then coating a flexible solution on the carrier substrates or pasting a flexible thin film on the carrier substrates, after coating the flexible solution, curing the flexible solution by heating or ultraviolet light irradiation to form a flexible thin film; the flexible thin film could be pasted via surface treatments or a double-sided adhesive;

a step S101 of forming a plurality of films on each of the carrier substrates obtained by the step S100 to form an array substrate and a color filter substrate;

a step S102 of cutting the color filter substrate and coating the array substrate and the color filter substrate with a sealant and liquid crystal compounds;

specifically, because a voltage needs to be applied in subsequent processes, in the step S102, the color filter substrate needs to be cut, and a cutting portion mainly refers to a corresponding area of a common electrode cured on the array substrate which is to be assembled with the color filter substrate; in this way, after cutting, it is easier to connect and apply a voltage to the common electrode exposed from the array substrate after the assembly;

a step S103 of bonding the color filter substrate with the array substrate opposite to each other and irradiating an ultraviolet light;

at this time, in the step S103, there is still sealant remaining between the two substrates in the process of assembly, therefore, an irradiation with the ultraviolet light is necessary to cure the sealant, during the irradiation, only the sealant area is irradiated to prevent damage to the liquid crystals and device;

at the same time, only part of the color filter substrate is cut off while cutting, without affecting the usage of the display panel, therefore, order of the above-mentioned steps S102 and S203 are interchangeable, that is, cutting color filter substrate after curing the sealant;

a step S104 of applying a voltage to the array substrate to polymerize the liquid crystal compounds to form a plurality of polymer walls;

the step S104 is a process of forming the plurality of polymer walls; the plurality of metal electrodes are arranged on the array substrate and the plurality of metal electrodes are connected with the common electrode, therefore, when the voltage is applied to the common electrode and the color filter substrate, a conducting circuit is constructed. Phase separation of the liquid crystal compounds during assembly occurs due to charges. As charging continues, liquid crystals of the liquid crystal compounds with high dielectric constant are separated to an area above the plurality of metal electrodes. It takes about 1 minute to 5 minutes to fully complete the phase separation. Then, the substrate is heated. At this time, substances gathered in a non-aperture region are polymerized and cured to form a plurality of walls. The plurality of walls connect upper and lower substrates to block the liquid crystals in left and right regions of the plurality of walls and prevent the liquid crystals in the left and right regions from convection.

Specifically, when applying the voltage, applied voltage is in a range of 3V to 10V, heating temperature is in a range of 100° C. to 150° C., and heating time is in a range of 30 mins to 180 mins. It should be noted that the voltage cannot be removed during the heating process, for the purpose of preventing the re-mixing of separated liquid crystals and monomers.

Figure 5:
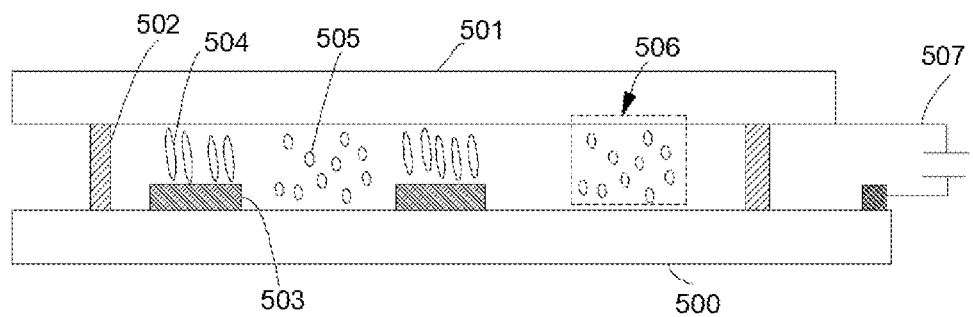
FIG. 5 is a schematic view of an applied voltage provided by embodiments of this disclosure.

Specifically, as shown in FIG. 5, FIG. 5 is a schematic view of an applied voltage provided by embodiments of this disclosure. The voltage is applied between an array substrate 500 and a color filter substrate 501, as shown as the voltage 507 in the figure, among the whole structure, the liquid crystal compounds (liquid crystals 504, monomers 505, etc.) are sealed into the space between the two substrates by a sealant 502. When the voltage is applied, the plurality of metal electrodes 603 is powered up. Some substances with low dielectric constants, such as the monomers 505 and so on aggregate at a first area 506 without metal electrodes 503 under the voltage, and the substances in the first area 506 are cured to form the plurality of walls in subsequent heating process.

A step S105 of separating the flexible thin film from the carrier substrates to form a flexible display panel.

At this time, the plurality of walls are basically done curing, redundant films can be separated and removed by laser separation and mechanical separation. Finally, a desired flexible display panel is manufactured.

In the whole manufacturing processes mentioned above, the liquid crystals injected into the substrates can be filled by traditional way, that is, the liquid crystals are filled into the space between a pair of substrates assembled after curing of the sealant is completed. Under this circumstance, after the filling is completed, seal the opening used for filling liquid crystals with adhesive. Then, complete the subsequent processes and finally a desired flexible display panel is manufactured.

A detail description of a display panel and a manufacturing method of the display panel provided by embodiments of this disclosure are illustrated hereinbefore. The description of the above embodiments is only intended to help understand the technical schemes and core concepts of this disclosure. It is noted that those with ordinary skill in the art could make various modifications to technical schemes described in the embodiments above-mentioned, but these modifications and replacements do not depart from the scope of the technical schemes of the embodiments provided by the present disclosure.

What is claimed is:

1. A liquid crystal display panel, comprising:
   an array substrate;
   a color filter substrate, wherein the color filter substrate is disposed opposite to the array substrate;
   a sealant, wherein the sealant is disposed on edges of the array substrate and the color filter substrate, and the sealant seals the array substrate and the color filter substrate;
   a plurality of electrodes at least disposed in an aperture region of the array substrate;
   liquid crystals disposed between the array substrate and the color filter substrate, and located corresponding to the plurality of electrodes; and
   a plurality of walls arranged in a non-aperture region of the array substrate between the plurality of electrodes adjacent to each other, wherein bottom portions of the plurality of walls contact an inner surface of the array substrate, and top portions of the plurality of walls contact an inner surface of the color filter substrate, each of the walls comprises polymers, and dielectric constants of monomers of the polymers are lower than dielectric constants of the liquid crystals;
   wherein the liquid crystal display panel further comprises a plurality of gate lines, the plurality of electrodes comprise a plurality of first electrodes and a plurality of second electrodes, the first electrodes are arranged in the aperture region and the second electrodes are arranged around the plurality of gate lines, the liquid crystal display panel further comprises a common electrode line and a common electrode, the plurality of first electrodes and the plurality of second electrodes are connected with the common electrode line, and the common electrode line is connected with the common electrode.

2. The liquid crystal display panel of claim 1, wherein the liquid crystals comprise nematic liquid crystals.

3. The liquid crystal display panel of claim 1, wherein the walls comprise thermal initiators, and the thermal initiators comprise one or more of diethylenetriamine, triethylenetramine, 4,4'-Methylenedianiline, and polyatomic acid.

4. The liquid crystal display panel of claim 1, wherein the electrodes are further disposed in the non-aperture region of the array substrate.

5. A liquid crystal display panel, comprising:
   an array substrate;
   a color filter substrate, wherein the color filter substrate is disposed opposite to the array substrate;
   a sealant, wherein the sealant is disposed on edges of the array substrate and the color filter substrate, and the sealant seals the array substrate and the color filter substrate;
   a plurality of electrodes at least disposed in an aperture region of the array substrate;
   liquid crystals disposed between the array substrate and the color filter substrate, and located corresponding to the plurality of electrodes; and
   a plurality of walls arranged in a non-aperture region of the array substrate between the plurality of electrodes adjacent to each other, wherein bottom portions of the plurality of walls contact an inner surface of the array substrate, and top portions of the plurality of walls contact an inner surface of the color filter substrate, each of the walls comprises polymers, and dielectric constants of monomers of the polymers are lower than dielectric constants of the liquid crystals;
   wherein each of the electrodes is arranged around at least two sub-pixel units.

* * * * *